United States Patent
Cameron

(10) Patent No.: US 6,544,489 B2
(45) Date of Patent: Apr. 8, 2003

(54) DEFOAMING COMPOSITIONS FOR HIGH ACID STRENGTH MEDIA

(75) Inventor: Timothy B Cameron, Mulberry, FL (US)

(73) Assignee: Custom Chemicals Corporation, New York, NY (US)

( * ) Notice: Subject to any disclaimer, the term of this patent is extended or adjusted under 35 U.S.C. 154(b) by 0 days.

(21) Appl. No.: 09/754,082

(22) Filed: Jan. 5, 2001

(65) Prior Publication Data

US 2002/0002206 A1 Jan. 3, 2002

Related U.S. Application Data

(60) Provisional application No. 60/174,538, filed on Jan. 5, 2000.

(51) Int. Cl.$^7$ .......................... B01D 19/04; C01B 25/22
(52) U.S. Cl. ..................... 423/320; 423/157.4; 516/133
(58) Field of Search .......................... 516/133; 423/320, 423/157.4

(56) References Cited

U.S. PATENT DOCUMENTS

| | | | | |
|---|---|---|---|---|
| 2,630,440 A | * | 3/1953 | Gunderson ................... | 516/133 |
| 2,773,041 A | * | 12/1956 | Larsen et al. ................ | 516/133 |
| 3,238,142 A | | 3/1966 | Perry .......................... | 516/134 |
| 3,437,437 A | | 4/1969 | Dorwart, III ................. | 516/129 |
| 3,594,123 A | * | 7/1971 | Encke et al. ................. | 516/132 |
| 3,653,827 A | | 4/1972 | Hey et al. .................... | 516/130 |
| 3,671,461 A | | 6/1972 | Sheers et al. ................ | 516/134 |
| 4,065,402 A | | 12/1977 | Satterwhite et al. ......... | 516/126 |
| 4,065,403 A | | 12/1977 | Satterwhite et al. ......... | 516/126 |
| 4,065,404 A | | 12/1977 | Satterwhite et al. ......... | 516/126 |
| 4,220,630 A | | 9/1980 | Oré ........................... | 423/157.4 |
| 4,277,448 A | | 7/1981 | Ore et al. ................... | 423/157.4 |
| 4,363,786 A | | 12/1982 | Adams et al. ............... | 422/189 |

FOREIGN PATENT DOCUMENTS

| | | | |
|---|---|---|---|
| JP | 55167012 A | * | 12/1980 |
| JP | 59-147608 | * | 8/1984 |

OTHER PUBLICATIONS

Derwent Database on East, week 198440, London: Derwent Publications Ltd., AN 1984–246352, JP 59147608 A, (Nippon Oil & Fats Co.) abstract.*

Kirk–Othmer Encyclopedia of Chemical Technology, Fourth Edition, vol. 23 pp. 616–617 (John Wiley & Sons, NY, NY) Jul. 1997.*

Hawley's Condensed Chemical Dictionary, Eleventh Edition, Edited by Sax and Lewis, Jr. (Van Nostrand Reinhold Company, NY, NY copyright 1987), pp. 1, 702, 1015 amd 1118 (Oct. 1989).*

Database Derwent on East, week 198110, London: Derwent Publications Ltd., AN 1981–16244D, JP 55167012 A, (Asashi Denka Kogyo) abstract.*

English language translation of JP 59–147608, reference published Aug. 24, 1984, PTO–02–1728 (United States Patent and Trademark Office, Mar. 2002), pp. 1–8.*

* cited by examiner

Primary Examiner—Daniel S. Metzmaier
(74) Attorney, Agent, or Firm—Dennison, Schultz & Dougherty

(57) ABSTRACT

A defoaming composition useful in high strength acid media includes an ester condensate of a $C_{12}$–$C_{20}$ fatty acid and a at least one alcohol derivative selected from the group consisting of $C_1$–$C_4$ alcohol ethoxylates having at least three ethoxylate residues per molecule, $C_1$–$C_4$ alcohol propoxylates having at least three propoxylate residues per molecule and $C_1$–$C_4$ alcohol mixed ethoxylate-propoxylates having at least three total ethoxylate and propoxylate residues per molecule. The condensate is preferably liquid at room temperature and miscible with water.

23 Claims, No Drawings

DEFOAMING COMPOSITIONS FOR HIGH ACID STRENGTH MEDIA

BACKGROUND OF THE INVENTION

1. Field of the Invention

The invention relates to the field of defoamers which control foam in high strength acid media, in particular as exists in the "wet process" synthesis of phosphoric acid.

2. Description of Related Art

In the manufacture of phosphoric acid by the method commonly referred to as the "wet process," phosphate rock is digested with sulfuric acid and concentrated to yield free phosphoric acid and gypsum. Most often, the process results in generation of foam, which is believed to arise from the interaction between residual organic matter in the phosphate rock and gases or vapors released during the reaction. To maximize the efficiency of the "wet process," it is necessary to add defoamers in the reaction.

To control foam, defoamers typically employed include sulfated or sulfonated oleic acid or other tall oil fatty acids free tall oil fatty acids and their mono, diester, alkanolamide or polyethyleneamine derivatives. Additional compounds which may be employed include nonionic surfactants including various alkylethoxylates and alkylphenolethoxylates. Further, short and long chain alcohols and various silicone additives have also been used to enhance defoamer performance. Generally, compatible blends of any of the above classes of additives can be formulated to give the desired defoaming properties for a particular phosphate rock. Custom formulated reagents are not uncommon given the variations in rock quality found within the industry. Moreover, it is usually the case that blends often outperform any one class of defoamers alone.

In earlier times, a reliance on higher quality tall oil fatty acids was commonplace owing to their relatively low titer points and ease of handling. More recently, due to economic considerations, lower purity tall oil fatty acid streams, for example crude tall oil, tall oil heads and tall oil bottoms fractions have been substituted, where possible. However, such substitutions have often resulted is diminished performance and increased titer point to the extent that the defoamer is no longer liquid or pumpable at room temperature. Therefore, it would be useful to have a defoamer which is not only low in cost but is also more effective than the conventional defoamers being marketed.

SUMMARY OF THE INVENTION

It is therefore an object of the invention to provide a defoamer which is low in cost but which is as effective as higher cost defoamers.

It is another object of the invention to provide a defoamer which is readily dispersible and able to be blended with other additives, i.e., fatty mono and diesters or amide derivatives, among others, while also allowing the incorporation of water, if necessary.

To achieve these and other objects, the invention is directed to a defoaming composition useful in high strength acid media, comprising an ester condensate of a $C_{12}$–$C_{20}$ fatty acid and at least one low molecular weight alcohol derivative selected from the group consisting of $C_1$–$C_4$ alcohol ethoxylates. having at least three ethoxylate residues per molecule,. $C_1$–$C_4$ alcohol propoxylates having at least three propoxylate residues per molecule and $C_1$–$C_4$ alcohol mixed ethoxylate-propoxylates having at least three total ethoxylate and propoxylate residues per molecule. Preferably, the condensate will be liquid at room temperature (about 20° C.) and miscible with water.

Indeed, formulations have been prepared containing as much as 30% by weight water or more. The degree of such miscibility will depend on such factors as acid number of the fatty acid and number of EO or PO groups per molecule of the alcohol derivative. Generally, the miscibility limit is about 35% by weight water; adding water in excess of the limit produces a dispersion.

The advantages of mixing the defoamer with water include reduced viscosity of the product as well as reduced cost. Further, the use of water has been found to be indispensable when preparing formulations with normally incompatible additives. For example, the addition of 10% by weight water enables the condensate of the invention to be mixed with fatty acid polyamine condensates, which would normally be incompatible.

DETAILED DESCRIPTION OF THE INVENTION

The composition of matter of the invention is a defoamer useful for controlling the foam in a high strength acid media which comprises, broadly, condensates of tall oil fatty acids with $C_{1-4}$ alcohol ethoxylate (EO) or propoxylate (PO) bottoms. More specifically, the tall oil fatty acid mixture may possess acid numbers from 90 to 165 or more, while the bottoms alcohol ethoxylate or propoxylate will usually contain at least three EO or PO residues per molecule.

The condensation reaction is a simple esterification reaction which takes place at elevated temperatures of about 150 to 250° C. Catalyst may be present, but is not necessary. The alcohol ethoxylate/propoxylate is preferably present in a slight stoichiometric excess, at least about 1.05 equivalents per equivalent of acid, to give improved yields.

A variety of fatty acid starting materials may be used including a fatty acid of formula $C_nH_{2n+1}COOH$ where n is an integer from 11 to 19, a fatty acid of formula of $C_nH_{2n-1}COOH$ where n is an integer from 13 to 19, and including least one double bond, and a fatty acid of formula $C_nH_{2n-3}COOH$, where n is an integer from 15 to 19, and including two double bonds. Mixture of such fatty acids may be used.

The fatty acids used to prepare the defoamers of the invention are preferably derived from a tall oil source, and more preferably a low cost tall oil source, such as tall oil heads. Preferably, the tall oil will have an acid number of at least about 90. When the fatty acid is derived from a tall oil source, the fatty acid may additionally contain resin or rosin acids comprising a majority of abietic acid having a formula of $C_{20}H_{30}O_2$, as in the case of crude tall oil. Other fatty acid sources, such as vegetable oil sources may also be used, although these other sources tend to be more expensive, and is therefore less desirable.

The low molecular weight alcohol ethoxylate or propoxylate is preferably derived from an alcohol of formula $C_nH_{2n+1}OH$, wherein n is an integer from 1 to 4. Such alcohols are alkanols including methanol, ethanol, propanol and butanol. The low molecular weight alcohol ethoxylate or propoxylate preferably comprises distillation residues containing at least three, and more preferably at least five ethoxylate and/or propoxylate residues per molecule. Commercially available products typically contain mixtures of such materials, for example, with 3, 4, 5, 6 or more EO or PO groups.

It is a substantial advantage that the defoamers of the invention may be co-blended with other known defoamer additives, including but not limited to free fatty acids, fatty acid mono-, di- and triester derivatives, and fatty acid aminoester and aminoamide derivatives. Where such additives would not ordinarily be compatible with the defoamer of the invention, the addition of a small amount of water will frequently result in a compatible mixture.

A series of tests of defoamers according to the invention was carried out as set forth in the following examples using a modified 1000 ml graduated cylinder, fitted with a heated water bath, overhead stirrer and additional ports for a temperature probe and concentrated sulfuric acid addition funnel. In a typical run, 150 grams of 40% phosphate rock slurry in water and 170 grams recycle phosphoric acid were first added to the cylinder and stirring begun. Once a slurry temperature of 60° C. (140° F.) was achieved, defoamer was added by syringe followed by 50 ml of concentrated sulfuric acid. Foam height was then recorded as a function of time.

EXAMPLE 1

Westvaco Liqrene 100, a tall oil heads byproduct having an acid value of 128, was reacted with 1.1 equivalents of Dow Chemical EB Highers, a butyl alcohol ethoxylate bottom of hydroxyl value 161, at a temperature commencing at 160° C. and ending at 200° C. to give a readily fluid butyl capped ester derivative. The product possessed a final acid number of 12.1.

Phosphate rock and recycle acid were obtained from CF Industries, Plant City, Fla. Using the reaction product in the manner outlined, total defoamer required was 1.2 lb/T with a competitive standard believed to contain a blend of free and esterified tall oil fatty acids, whereas only 0.6 lb/T of the ester of the invention was required.

EXAMPLE 2

An ester was prepared from the tall oil of Example 1 with Hercules Pamak LE in a reaction as in Example 1, and formulated with 25% by weight water. In a test, only 0.6 lb/T of this defoamer was required to give performance equal to the standard.

EXAMPLE 3

The ester prepared in Example 2 was blended with, by weight, 20% water and 10% of a polyethylenepolyamine condensate based upon the same fatty acid heads product. Defoaming performance was similar to the above examples.

EXAMPLE 4

Phosphate rock from the Indo-Jordan Abyad mine was used to prepare the phosphoric acid as described above, with the defoamer utilized in Example 2. The comparative defoamer was believed to a PEG-400 distillate "heavy oxo ends" blend. Results indicated defoamer consumption could be reduced by 35%, with respect to the comparative defoamer.

While the invention has been described herein with reference to particular embodiments thereof, and specific examples, a latitude of modifications, various changes and substitutions are intended in the foregoing disclosure, and in some instances some features of the invention will be employed without a corresponding use of other features without departing from the scope of the invention as set forth.

What is claimed is:

1. A method for controlling foam in a high strength acid media comprising adding to said high strength acid media a defoaming composition comprising an ester condensate consisting essentially of a $C_{12}$–$C_{20}$ fatty acid and at least one $C_1$–$C_4$ alcohol propoxylate having at least three propoxylate residues per molecule, wherein said alcohol is of a formula $C_nH_{2n+1}OH$, where n is an integer from 1 to 4.

2. The method of claim 1, wherein said fatty acid is of a formula $C_nH_{2n-1}COOH$, where n is an integer from 11 to 19.

3. The method of claim 2, wherein the high acid strength media comprises sulfuric acid and phosphoric acid.

4. The method of claim 1, wherein said fatty acid is of a formula $C_nH_{2n-1}COOH$ containing at least one double bond, where is an integer from 13 to 19.

5. The method of claim 1, wherein said fatty acid is of a formula $C_nH_{2n-3}COOH$ containing two double bonds, where n is an integer from 15 to 19.

6. The method of claim 1, wherein the fatty acid is derived from a tall oil source.

7. The method of claim 1, wherein the fatty acid is from a source additionally containing resin or rosin acids comprising a majority of abietic acid having a formula of $C_{20}H_{30}O_2$.

8. The method of claim 1, wherein said alcohol derivative contains at least five residues per molecule.

9. The method of claim 1, additionally comprising at least one further defoamer additive selected from the group consisting of free fatty acids, fatty acid mono-, di- and triester derivatives, and fatty acid aminoester and aminoamide derivatives.

10. The method of claim 9, wherein the condensate is present in an amount of at least about 10% by weight.

11. The method of claim 1, wherein the defoamer additionally comprises water.

12. In a method for preparing phosphoric acid by reaction of phosphate rock with sulfuric acid in a reaction mixture, the improvement comprising adding to said reaction mixture a defoamer composition comprising an ester condensate of a $C_{12}$–$C_{20}$ fatty acid and a at least one alcohol derivative selected from the group consisting of $C_1$–$C_4$ alcohol ethoxylates having at least three ethoxylate residues per molecule, $C_1$–$C_4$ alcohol propoxylates having at least three propoxylate residues per molecule and $C_1$–$C_4$ alcohol mixed ethoxylate-propoxylates having at least three total ethoxylate and propoxylate residues per molecule, wherein said alcohol is of a formula $C_nH_{2n+1}OH$, where n is an integer from 1 to 4.

13. The method of claim 12, wherein said fatty acid is of a formula $C_nH_{2n+1}COOH$, where n is an integer from 11 to 19.

14. The method of claim 12, wherein said fatty acid is of a formula $C_nH_{2n-1}COOH$ containing at least one double bond, where n is an integer from 13 to 19.

15. The method of claim 12, wherein said fatty acid is of a formula $C_nH_{2n-3}COOH$ containing two double bonds, where n is an integer from 15 to 19.

16. The method of claim 12, wherein the fatty acid is derived from a tall oil source.

17. The method of claim 12, wherein the fatty acid is from a source additionally containing resin or rosin acids comprising a majority of abietic acid having a formula of $C_{20}H_{30}O_2$.

18. The method of claim 12, wherein said alcohol derivative contains at least five residues per molecule.

19. The method of claim 12, wherein the defoamer composition additionally comprises at least one further defoamer additive selected from the group consisting of free fatty acids, fatty acid mono-, di- and triester derivatives, and fatty acid aminoester and aminoamide derivatives.

20. The method of claim 19, wherein the condensate is present in an amount of at least 10% by weight.

21. The method of claim 12, wherein the defoamer composition additionally comprises water.

22. The method of claim 12, wherein the condensate is liquid at room temperature.

23. The method of claim 12, wherein the condensate is at least partially miscible with water.

* * * * *